March 16, 1943.  H. LIEBERHERR  2,314,227
COUPLING FOR TRANSMITTING TORQUES
Filed Oct. 3, 1941  2 Sheets-Sheet 1

INVENTOR
Hans Lieberherr
BY
ATTORNEYS

March 16, 1943. H. LIEBERHERR 2,314,227
COUPLING FOR TRANSMITTING TORQUES
Filed Oct. 3, 1941 2 Sheets-Sheet 2
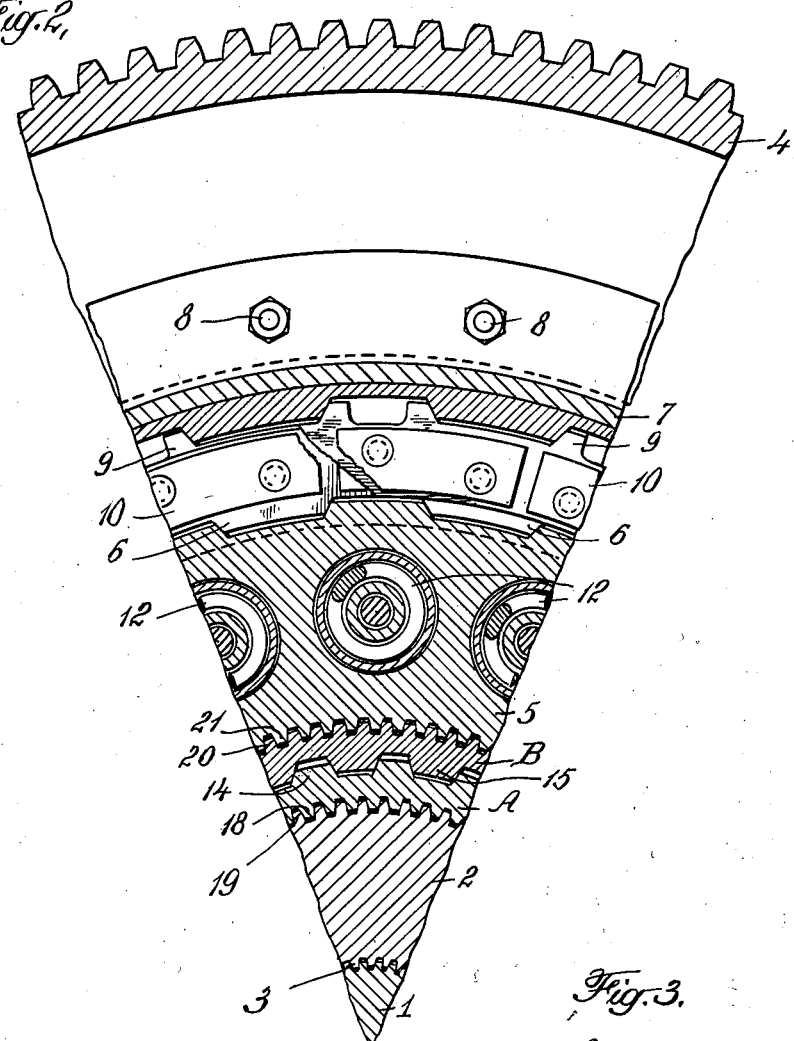
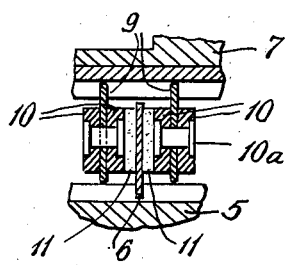
INVENTOR
Hans Lieberherr
BY
Pennie, Davis, Marvin & Edmonds
ATTORNEYS Patented Mar. 16, 1943

2,314,227

UNITED STATES PATENT OFFICE 2,314,227

COUPLING FOR TRANSMITTING TORQUES

Hans Lieberherr, Winterthur, Switzerland, assignor to Sulzer Frères, Société Anonyme, Winterthur, Switzerland Application October 3, 1941, Serial No. 413,425
In Switzerland November 8, 1940

10 Claims. (Cl. 64—30)

The invention relates to a coupling for transmitting torques having frictional elements which press on each other as long as the torque does not exceed permissible limits and slide on each other when the torque exceeds the permissible limits. According to the invention, the torque is transmitted from a driving element to a driven element through the frictional elements by two axially movable rings, each preferably provided with slidable engaging means, for example with spur-wheel teeth and meshing with each other concentrically by means of at least one set of inclined teeth. The rings are preferably arranged in such a way, between means pressing the frictional elements together, that the pressing elements are forced apart by the rings whether rotation is in one direction or in the other, thereby releasing the friction elements from coupling contact.

For further relieving the frictional elements, particularly when the permissible torque has been exceeded for a long period of time, a safety member is applied to at least one frictional element, consisting of a substance which will be destroyed in consequence of impermissibly high frictional temperature and removed from its position on the frictional element. Special faces may be provided on which the pressing elements will come to rest after the safety member has been destroyed, so that the frictional elements are completely relieved. The safety member is preferably made of a substance which melts at an impermissibly high temperature. Preferably the safety member is arranged between two frictional elements on the same part of the coupling. One or more of the surfaces of the frictional elements may be covered with a special friction covering of a material such as is commonly used for clutch or brake surfaces. The safety member may be arranged between two metallic frictional elements which are not fitted with any special friction covering. In certain cases also the safety member may be soldered to a metallic frictional element. The safety member may also be used as a friction covering of a frictional element.

In the accompanying drawings:

Fig. 2 is a view along the line 2—2 of Fig. 1, and

Fig. 3 is a fragmentary sectional view of a modified form of torque coupling.

Figure 1:
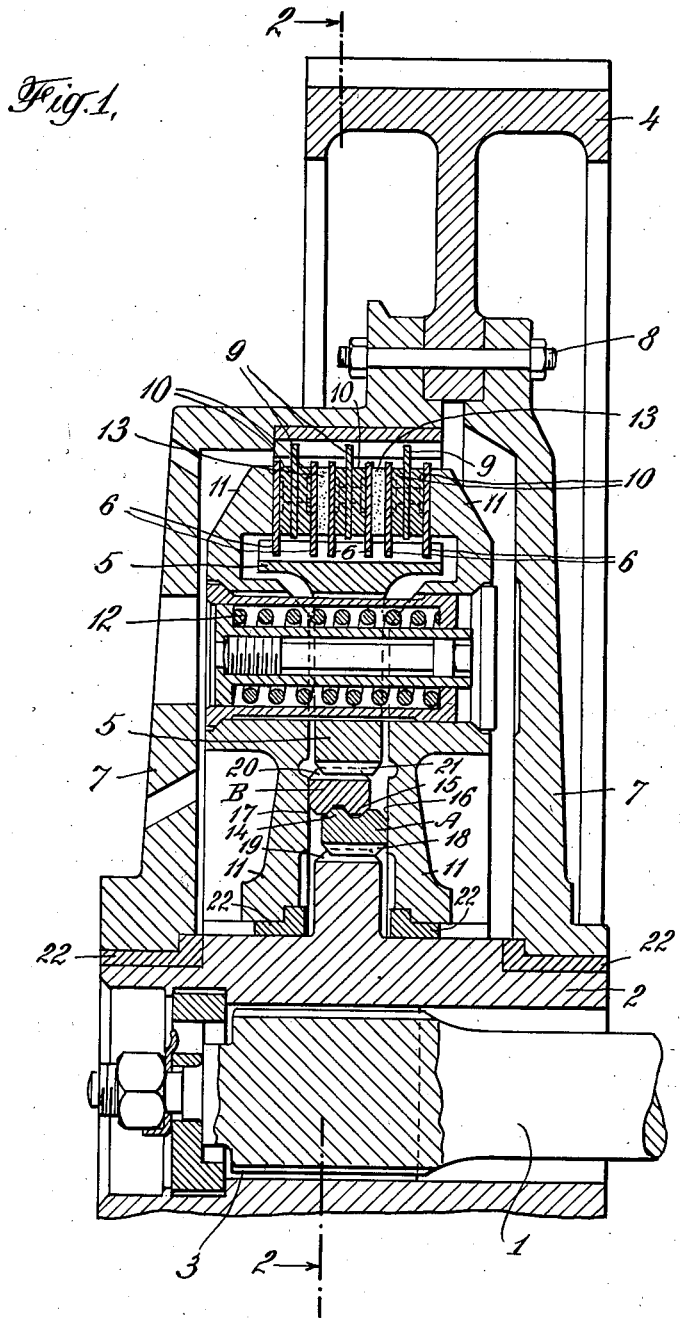
Fig. 1 is a longitudinal sectional view of a torque coupling embodying the invention.

The shaft 1 is keyed to the hub 2 by the teeth 3 and a torque may be transmitted from the shaft to the toothed wheel 4, or vice versa according to the working conditions. One part of the coupling comprises the shaft 1, a hub 2, two concentric rings A and B, provided both internally and externally with spur-wheel teeth, coupling spider 5 and frictional elements 6 made of metal, for instance steel plate. The other part of the coupling has a coupling drum 7 connected by bolts 8 to the toothed wheel 4 and frictional elements 9 made of metal and provided with friction coverings 10. The frictional elements 6 and 9 of the two parts of the coupling are pressed together by means of the pressing elements 11 and the springs 12. On some of the frictional elements 6 there is a fusible safety member 13, made for instance of sheet zinc. The friction coverings 10 may be attached to the frictional elements 9 in any suitable way as by means of rivets 10a and the safety members 13 may be connected to the frictional elements in any suitable way as by welding or soldering.

The rings A and B are intermeshed by means of oblique teeth 14 and 15 in such a way that when a torque is being transmitted, an axial force is produced which pushes the rings axially away from each other. Ring A then comes against the face 16 and ring B against the face 17 of the pressing elements 11. The inner ring A is in mesh with the axial set of teeth 18 in a corresponding set of teeth 19 of the hub 2. The outer ring B meshes with its set of teeth 20 in a set of teeth 21 of the coupling spider 5. When the torques transmitted are normal, the axial force of the rings A, B is not sufficient to force the pressing elements 11 apart against the action of the springs 12. But as soon as the torque exceeds a permissible value, the axial force of the rings A, B is so great that the frictional elements 6 and 9 are no longer pressed strongly enough together in order to prevent their sliding. The elements 6 and 9 then slide on each other, thus preventing the torque from becoming unduly high.

Should the excessive torque cause the frictional elements 6 and 9 to slip for some length of time and thus to generate a great amount of heat, the temperature of the friction coverings 10 rises, since the heat cannot be dissipated quickly enough. If the friction coverings were not separated from each other soon, for instance in one or a few seconds (corresponding to about 30 to 50 revolutions of the shaft), their strength might become so impaired that they would be destroyed and thus further damage would be caused by the broken particles. The rising temperature will quickly cause the safety members to be heated to the fusing temperature, and the liquid metal, for example zinc, is removed because of centrifugal force. In this way and in a short time sufficient clearance is formed between the frictional elements that the faces 16 and 17 of the pressing elements 11 engage the coupling spider 5, so that the frictional elements are fully relieved. One side of the coupling can then rotate frictionless with respect to the other. When the pressing elements 11 are forced apart by the rings A and B, the coupling drum 7, pressing elements 11 and wheel 4 rotate on the bearings 22 with respect to the hub 2 on which the bearings are mounted.

For the safety members tin, lead, antimony or similar metallic substances which are easily fusible may also be used. Also for this purpose, organic substances may be used which become brittle and fragile at unduly high temperatures and fall away from their original position after breaking up into small pieces. In the modification illustrated in Fig. 3, two frictional elements 9 are shown, between which a frictional element 6 is arranged. On the friction elements 9 the frictional coverings 10 are fastened by rivets 10a, while on each of the two sides of the element 6 a fusible safety member 13 is soldered. The safety members may also be arranged directly between two frictional elements, for instance by casting in or by being vulcanized in. It would also be possible to make the friction covering of a frictional element of a material which possesses the necessary frictional properties at normal load and normal temperatures, but is destroyed at an unduly high temperature, so that it acts as a safety member.

I claim:

1. A coupling for transmitting torques, in which the frictional elements press on each other as long as the torques does not exceed permissible limits and are relieved so that they slide on each other when the torque exceeds such permissible limits, which comprises two axially movable rings for transmitting the torque each provided both inwardly and outwardly with spur-wheel teeth, the rings meshing with each other concentrically by means of a set of teeth, each ring having at least one set of inclined teeth, means pressing the frictional elements together, said rings being arranged in such a way between the means pressing the frictional elements together that the pressing elements are forced apart by the rings whether rotation is in one direction or in the other.

2. A coupling for transmitting torques, in which the frictional elements press on each other as long as the torque does not exceed permissible limits and are relieved so that they slide on each other when the torque exceeds such permissible limits, which comprises two axially movable rings for transmitting the torque each provided both inwardly and outwardly with spur-wheel teeth, the rings meshing with each other concentrically by means of a set of teeth, each ring having at least one set of inclined teeth, means pressing the frictional elements together, said rings being arranged in such a way between the means pressing the frictional elements together that the pressing elements are forced apart by the rings whether rotation is in one direction or in the other, and a safety member attached to at least one frictional element and pressed together with the frictional elements by the same means, said safety member consisting of a substance which will be destroyed in consequence of impermissibly high temperature resulting from a slipping of the frictional elements on each other and will be removed from its position on the frictional element.

3. A coupling as claimed in claim 2 which comprises a spider between and spaced from the pressing means, and faces on the pressing means which come to rest on the spider after the safety member has been destroyed, so that the frictional elements are completely relieved.

4. A coupling as claimed in claim 2 which comprises a safety member made of a metal having a relatively low melting point.

5. A coupling as claimed in claim 2 which comprises a safety member formed of a material easily destroyed by heat arranged between two frictional elements on the same part of the coupling.

6. A coupling as claimed in claim 2 which comprises a safety member formed of a material easily destroyed by heat arranged between two metallic frictional elements.

7. A coupling as claimed in claim 2 in which the safety member is soldered to a metallic frictional element.

8. A coupling as claimed in claim 2 in which the safety member is used as a friction covering of a frictional element.

9. A coupling for transmitting torques which comprises a driving element and a driven element, frictional elements coupling the driving and driven elements together so that they rotate as a unit, two axially movable concentric rings intermeshed together by means of inclined gear teeth, slidable engaging means connecting one ring to the driven element and other slidable engaging means connecting the other ring to the driving element, and resilient means pressing the frictional elements into non-sliding contact, said rings being adapted to axial movement as a result of rotation of one ring with respect to the other, whereby the frictional elements are disengaged when the torque is such as to overcome the pressing action of the resilient means.

10. A coupling for transmitting torques as defined in claim 9 which comprises at least one safety member interposed between the frictional elements which is made of a material easily destroyed as a result of excessive slipping of one frictional element with the safety member, thereby providing sufficient clearance between the frictional elements that they may rotate frictionless with respect to each other.

HANS LIEBERHERR.